April 19, 1955 G. P. McLAUGHLIN 2,706,375
LAWN RAKE
Filed Aug. 21, 1952
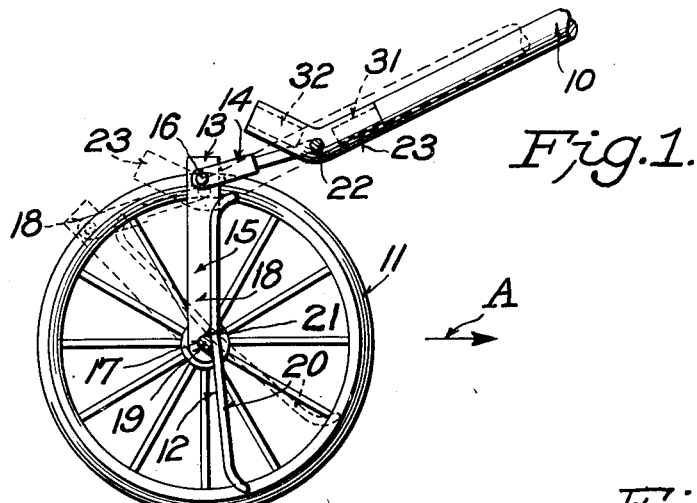
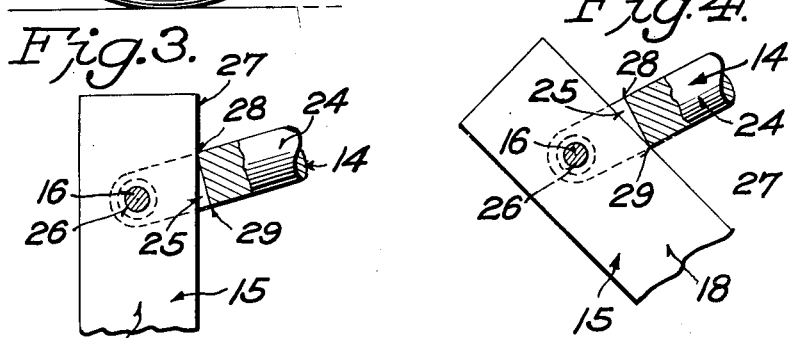
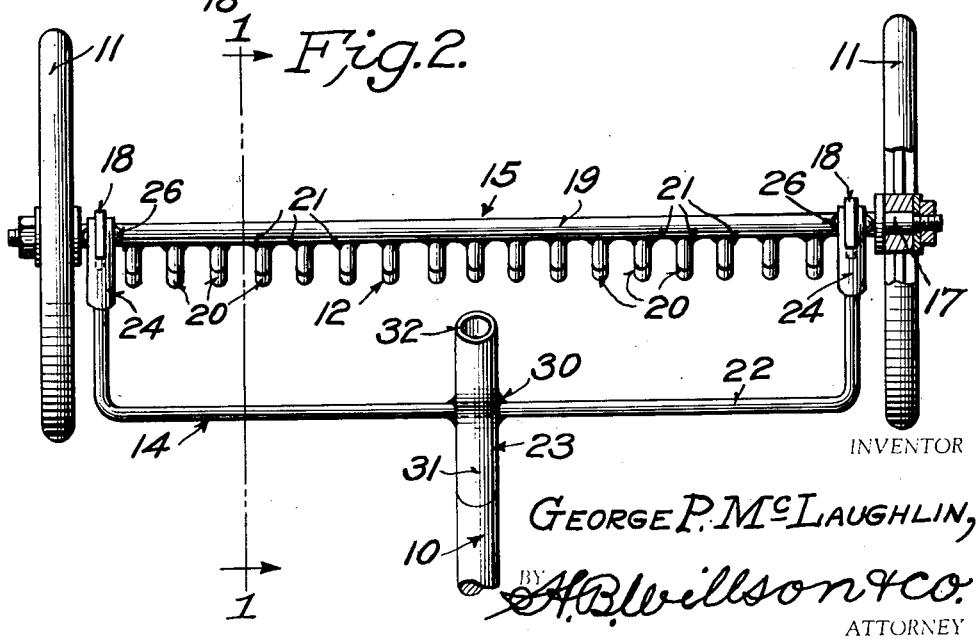
INVENTOR
GEORGE P. McLAUGHLIN,
BY H. B. Willson & Co.
ATTORNEY

United States Patent Office 2,706,375
Patented Apr. 19, 1955

2,706,375

LAWN RAKE

George P. McLaughlin, Shickshinny, Pa.

Application August 21, 1952, Serial No. 305,649

5 Claims. (Cl. 56—400.14)

My invention relates generally to surface cleaning tools such as rakes and brushes; and it relates more particularly to a wheeled rake which may be either pulled or pushed over a lawn or other surface by a handle to gather leaves, grass clippings, hay or other loose material on such surface.

While lawn rakes, mounted on mobile carriages so as to be pulled or pushed by hand, have been proposed, they have not come into general use; and it is an object of my invention to provide a hand implement of this character which is of extremely simple, inexpensive and durable construction, which is highly effective in operation and which may be used with very little physical effort.

Another object of the invention is to provide a tool of this character which when propelled in one direction will gather up leaves or other loose material on a surface but if any of such material is passed over by the rake head or other gathering element such as a brush head, a pull or push in the opposite direction will cause the gathering head or element to swing upwardly from the surface being cleaned and pass back over skipped material so that when the tool is again moved in the initial direction the cleaning element will be again swung downwardly into raking or gathering position and will then clean up the leaves or materials that were missed on the first pass of the device over the surface being cleaned.

Another object is to provide between the handle and the pivoted rake head a limited swinging connection so that movement of the handle in one direction will cause the rake teeth to assume a raking position and movement in the reverse direction will cause the rake teeth to swing up above a raking position.

Another object is to provide a rake of this character with two handle receiving sockets or their equivalents, either of which may receive the handle, so that the device may be pulled toward the operator as is the ordinary lawn rake or may be pushed as is a lawn mower.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a vertical section taken on line 1—1 in Fig. 2 of my improved wheeled hand rake showing in full lines the parts in the position they assume when the implement is pulled toward the operator or in the direction of the arrow A, and showing in dotted lines the positions the parts assumed when the handle is moved in the opposite direction to lift the rake teeth out of raking position, the handle being shown as broken off;

Fig. 2 is a top plan view with the parts in the full line position in Fig. 1, a part of one of the supporting wheels being broken away; and Figs. 3 and 4 are enlarged detail sectional views of parts of the connection between the handle and the pivoted rake head.

The embodiment of the invention illustrated in the drawings is a lawn rake but it is to be understood that for the toothed rake head there may be substituted a brush head or other equivalent element for picking up or moving loose material on the surface to be cleaned.

The invention comprises a single handle 10, at least two spaced supporting wheels 11, a cleaning or gathering element 12 and a connecting frame structure, generally indicated at 13, between the handle and the element 12 of such construction that when the handle is moved in one direction the gathering element is lowered to an operative position and when moved in the reverse direction the element will be raised to a non-gathering position. The connecting frame 13 preferably comprised two sections 14 and 15 pivotally connected together on a horizontal axis 16 for limited vertical swinging movement relative to each other, the section 14 having the handle fixed thereto and the section 15 carrying the rake head or element 12 for limited vertical swinging about a horizontal axis 17 and being supported by the wheels 11.

As illustrated the frame section 15 includes a pair of longitudinally spaced uprights 18 rising from a shaft 19, which forms the axis 17, and on the ends of which the wheels 11 may be journaled as shown in Fig. 2 or in any suitable manner. It is obvious that instead of mounting the shaft 19 in the hubs of the wheels, it may be mounted in a wheel supported frame.

The gathering element 12 is suitably fixed to the shaft 19 and depends therefrom between the wheels. As shown it consists of a row of suitably spaced rake teeth or tines 20 welded at 21 to the shaft 19 preferably between their ends to give the rake greater leaf moving capacity. While this construction really makes the shaft 19 a part of the rake head, the latter may be otherwise constructed and welded or otherwise secured to the shaft.

The frame section 14 is in the form of a generally U-shaped yoke 22 having at the center of its cross portion a handle attaching member 23 and at the ends of its two arms enlarged heads 24. To provide between the two frame sections a pivotal connection which will permit of a limited vertical swinging movement of one section with respect to the other, the ends of the heads 24 may be formed with slots 25 to receive the flat upper ends of the uprights 18 and these parts then connected by a pivot pin, rivet or bolt 26 which forms the pivot axis 16. The depth of the slots 25 and the distance between the axis 16 and the straight edge 27 of each of the uprights or posts 18 is such that stop shoulders 28 and 29 are formed at the ends of the bottom of each slot 25 to engage the edge 27, as shown in Figs. 3 and 4, to limit the relative swinging of the frame sections 14 and 15. Fig. 3 shows the upper stop 28 engaged with the edge 27, the position in which the parts are shown in full lines in Fig. 1, while Fig. 4 shows the lower stop 29 engaged with the edge 27 as in the dotted line position in Fig. 1.

The handle attaching member 23 may be either single or double as shown. It preferably consists of an angular body welded at its center as at 30 to the center of the yoke 22 with its two ends formed with sockets 31 and 32 either of which may receive the end of the handle 10. When the handle is fixed by friction or a set screw (not shown) in the socket 31, the device is operated similar to an ordinary rake by pulling the handle toward the operator. When that is done the rake teeth 20 will be held substantially vertical to pick up leaves, etc. and move them in the direction of the arrow A in Fig. 1. Should any leaves be passed over the handle is moved in the opposite direction and the teeth will swing up to the dotted line position in Fig. 1 so as to pass back over such leaves. Then the handle is again pulled in the direction of the arrow to return the rake teeth to their operating position so that the leaves that were missed on the first pass of the device will be gathered up. The device is thus operated by a to and fro motion similar to the ordinary hand rake.

When the handle is fastened in the other socket 32 it will of course extend in the opposite direction, and the device may be operated in a similar manner but the leaves will be gathered by a pushing movement. As above indicated the member 23 need have only one handle socket. It will also be understood that any suitable detachable or permanent connection may be provided between the handle and the member 23.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. A tool of the character set forth comprising a shaft, a gathering element rigidly fastened to said shaft and extending downwardly therefrom, means mounting said shaft for rotation and disposing it horizontally above the ground, said means including ground engaging wheels, uprights having their lower ends rigidly fastened to said shaft at the ends of said gathering element, a substantially U-shaped member having laterally spaced arms, a handle connected to the intermediate portion of said member, pivots connecting the ends of said arms to the upper portions of said uprights, and coacting means on said arms and said uprights adjacent said pivotal connections to limit the relative swinging movements of said arms and uprights.

2. The structure of claim 1 in which said uprights are flat plates and the ends of said arms are slotted to receive the latter, said pivots passing through the slotted portions of said arms and said plates, and in which said coacting means are formed by the ends of the bottom portions of the slots in said arms engaging edge portions of said upright plates.

3. The structure of claim 1 in which said means for mounting said shaft comprises a pair of ground engaging wheels rotatably mounted on the ends of said shaft.

4. The structure of claim 1 in which said gathering element comprises a row of spaced rake teeth fixed to and depending from said shaft between the arms of said U-shaped element.

5. A wheel-supported lawn rake comprising a horizontal shaft having journals at its ends, ground engaging wheels mounted on said journals, a row of spaced rake teeth fixed to said shaft between their ends and normally disposed vertically with their lower ends adjacent the ground, a pair of uprights having their lower ends fixed to said shaft at the ends of the row of rake teeth, the upper ends of said uprights having flat portions, a substantially U-shaped member having laterally spaced arms formed at their ends with slots to receive the flat portions of said uprights, pivots connecting the slotted ends of said arms to said uprights, the end portions of the bottoms of the slots in said arms serving as stops to engage the edges of the flat portions of said uprights to limit the relative swinging movement of said arms and uprights, and a handle connected to the intermediate portion of said member.

References Cited in the file of this patent

UNITED STATES PATENTS

| | | |
|---|---|---|
| 1,732,350 | Best | Oct. 22, 1929 |
| 2,126,573 | Potts | Aug. 9, 1938 |
| 2,178,288 | Potts | Oct. 31, 1939 |